(12) United States Patent
Nagahama et al.

(10) Patent No.: US 12,533,933 B2
(45) Date of Patent: Jan. 27, 2026

(54) VEHICLE DOOR BEAM

(71) Applicant: Honda Motor Co., Ltd., Tokyo (JP)

(72) Inventors: Taku Nagahama, Tokyo (JP); Ryo Onaka, Tokyo (JP); Nobuaki Kato, Tokyo (JP); Naoki Katsumata, Tokyo (JP); Shohei Ohtsuka, Tochigi (JP); Jiah Choi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 386 days.

(21) Appl. No.: 18/169,214

(22) Filed: Feb. 15, 2023

(65) Prior Publication Data

US 2023/0286360 A1    Sep. 14, 2023

(30) Foreign Application Priority Data

Mar. 10, 2022  (CN) .......................... 202210240503.0

(51) Int. Cl.
    *B60J 5/04*        (2006.01)
(52) U.S. Cl.
    CPC ........... *B60J 5/0423* (2013.01); *B60J 5/0437* (2013.01)
(58) Field of Classification Search
    None
    See application file for complete search history.

(56) References Cited

U.S. PATENT DOCUMENTS

| 5,404,690 A * | 4/1995 | Hanf .................... B60J 5/0437 |
| | | 296/187.12 |
| 9,266,412 B2 * | 2/2016 | Fujihara ................ B60J 5/0437 |
| 10,112,463 B2 * | 10/2018 | Deng .................... B60J 5/0437 |
| 2018/0208029 A1 * | 7/2018 | Tanaka .................... B60J 5/045 |

FOREIGN PATENT DOCUMENTS

| CN | 204279009 | | 4/2015 | |
| CN | 204355156 | | 5/2015 | |
| CN | 107225944 | | 10/2017 | |
| CN | 107336589 | | 11/2017 | |
| GB | 2296475 A | * | 7/1996 | ........... B60J 5/0437 |
| JP | H07232555 | * | 9/1995 | |
| JP | 4788423 | | 10/2011 | |
| KR | 2003084400 | * | 11/2003 | |
| KR | 20030088921 A | * | 11/2003 | |
| KR | 20030092856 A | * | 12/2003 | |
| KR | 20130032630 | * | 4/2013 | |
| KR | 20140013806 | * | 2/2014 | |
| KR | 101374737 | * | 3/2014 | |

OTHER PUBLICATIONS

"Office Action of China Counterpart Application", issued on Aug. 25, 2025, with English translation thereof, p. 1-p. 12.

* cited by examiner

*Primary Examiner* — Joseph D. Pape
(74) *Attorney, Agent, or Firm* — JCIPRNET

(57) ABSTRACT

A vehicle door beam is disclosed. The vehicle door beam includes: a beam body extending along a front-rear direction of a vehicle; and a bracket joining the beam body to the vehicle door body. The bracket includes a rib formed continuously on an extension line of the bracket extending along the beam body, and the rib is continued to a position of an end of the bracket.

6 Claims, 5 Drawing Sheets

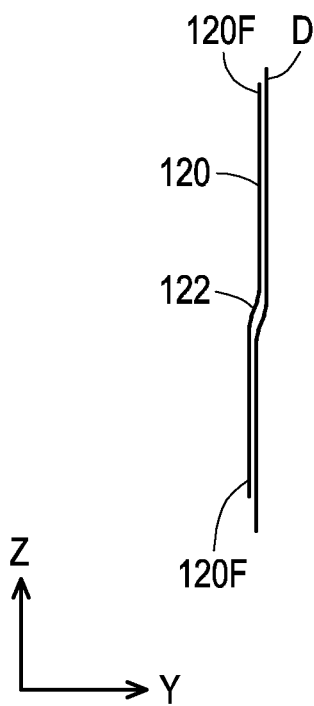
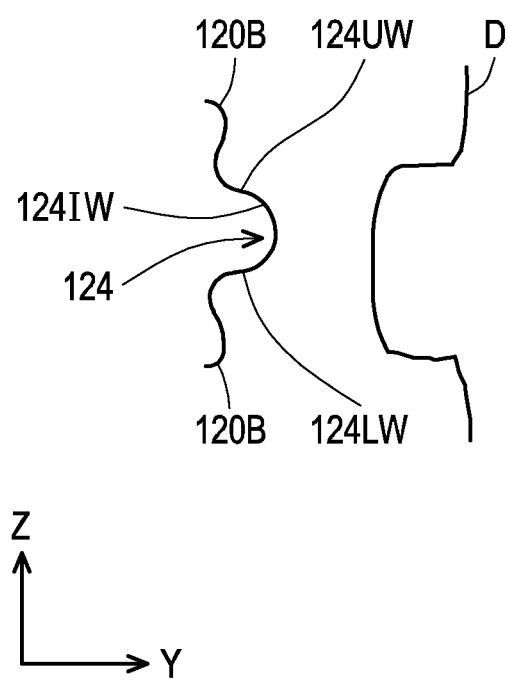
FIG. 5
FIG. 6

VEHICLE DOOR BEAM

CROSS-REFERENCE TO RELATED APPLICATION

This application claims the priority benefit of Chinese application no. 202210240503.0, filed on Mar. 10, 2022. The entirety of the above-mentioned patent application is hereby incorporated by reference herein and made a part of this specification.

BACKGROUND

Technical Field

The disclosure relates to a vehicle door beam. Particularly, the disclosure relates to a vehicle door beam disposed at a door of a vehicle.

Description of Related Art

In recent years, construction of safe cities and human settlements has been strengthened in all countries to strengthen inclusive and sustainable urban development, sustainable human settlements planning, and management capacity in all countries. Accordingly, it is necessary to strengthen the provision of safe, affordable, accessible, and sustainable transportation systems to all people in all countries; it is necessary to improve road safety, particularly expansion of public transport; and it is necessary to pay special attention to the needs of persons in vulnerable situations, women, children, persons with disabilities, and the elderly. In the field of transportation, there is an urgent need to take measures to address environmental issues to develop technologies that can improve the convenience and safety of public transportation.

In the manufacturing industry of conventional vehicles, a door structure for use in a vehicle has been disclosed, in which a vehicle door beam is disposed between an outer panel at a vehicle door outer side and an inner panel at a vehicle door inner side, and the vehicle door beam provides reinforcement against impact on the vehicle door from a lateral direction.

For example, Patent Document 1 (Japanese Patent Publication No. 4788423) discloses a vehicle door reinforcement structure, which is a vehicle side structure that suppresses entry of the vehicle door into the vehicle cabin due to deformation when the vehicle withstands side impact. In Patent Document 1, a rib part (50 in FIG. 10 in Patent Document 1) is disposed at an impact beam mounting part (beam extension) (i.e., 42 in FIG. 10 in Patent Document 1) of the impact beam disposed as a vehicle door beam in the vehicle door to enhance bending rigidity of the impact beam mounting part along the length direction.

Accordingly, in the convention (e.g., in Patent Document 1), not only a rib part (50 in FIG. 10 in Patent Document 1) and a flange part (42c in FIG. 10 in Patent Document 1) are disposed, but an engaging convex part (44 in FIG. 10 in Patent Document 1) is also disposed to connect the upper peripheral part and the lower peripheral part of each rib part to suppress cracking of the rib so as to prevent reduction in the bending rigidity of the impact beam mounting part along the up-and-down direction (F1 in FIG. 3 in Patent Document 1). However, it is unlikely to enhance impact absorption capacity of the impact beam mounting part in such an arrangement since the impact beam mounting part is displaced toward the vehicle width direction with substantially a planar appearance of the overall impact beam mounting part (i.e., the impact beam mounting part is not distorted) when deformation is generated in the vehicle under side impact. As a result, there is an issue in the convention as follows: it is unlikely to enhance impact absorption capacity of the beam extension when deformation (side protrusion) is generated in the vehicle door beam under an impact force from the side.

SUMMARY

The disclosure provides a vehicle door beam disposed at a vehicle door body of a vehicle. The vehicle door beam includes: a beam body extending along a front-rear direction of the vehicle; and a bracket joining the beam body to the vehicle door body. The bracket includes a rib formed continuously on an extension line of the bracket extending along the beam body, and the rib is continued to a position of an end of the bracket.

BRIEF DESCRIPTION OF THE DRAWINGS

FIG. 5 is a schematic view of the bracket of the vehicle door beam viewed from line A-A in FIG. 4.

FIG. 6 is a schematic view of the bracket of the vehicle door beam viewed from line B-B in FIG. 4.

DESCRIPTION OF THE EMBODIMENTS

Figure 1:
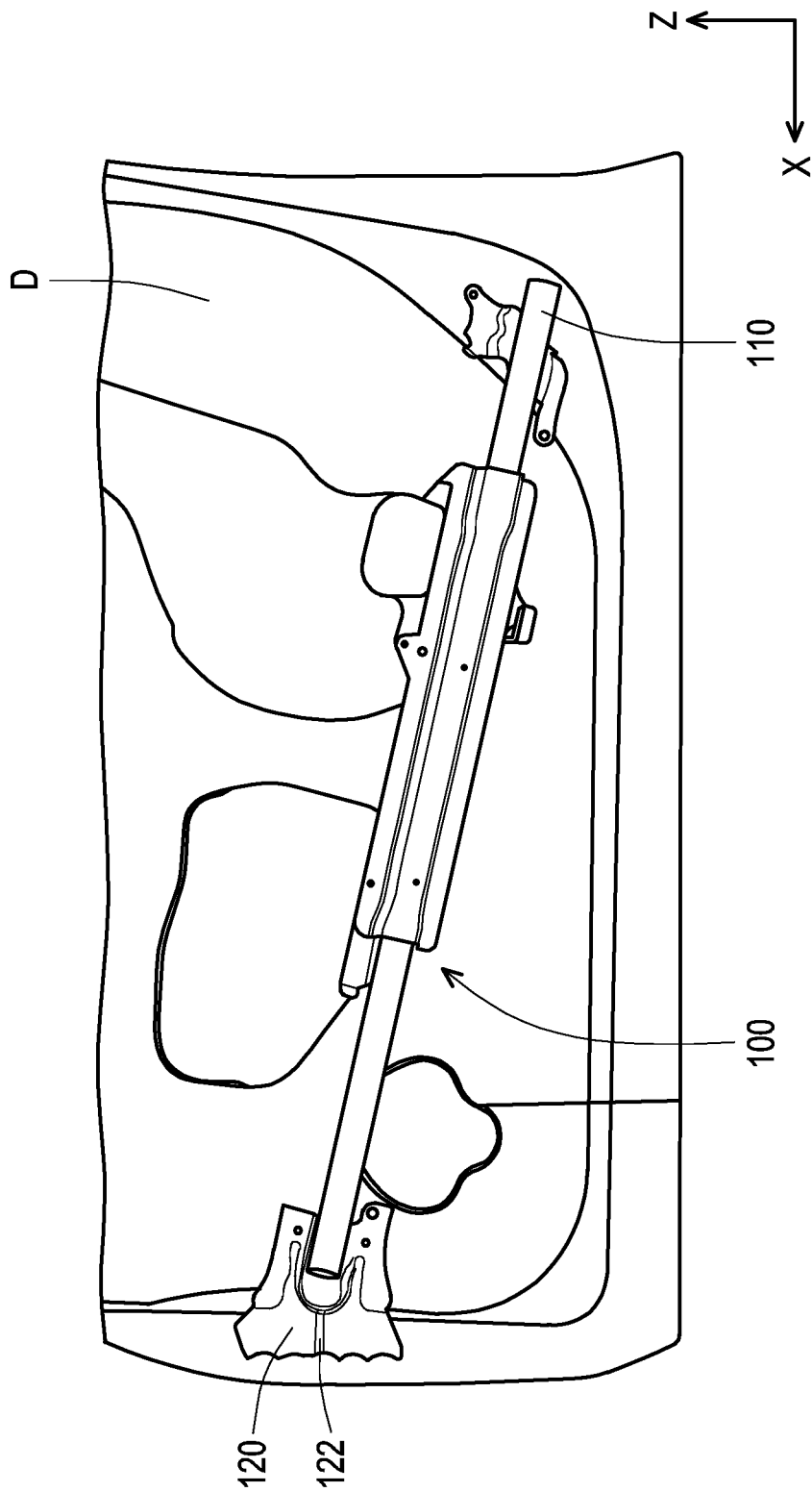
FIG. 1 is a schematic view schematically showing a vehicle door beam disposed at a vehicle door body according to an embodiment of the disclosure.

The disclosure provides a vehicle door beam. When deformation (side protrusion) is generated in the vehicle door beam under an impact force from the side, impact absorption capacity can be enhanced through deformation of a bracket, improving safety.

The disclosure provides a vehicle door beam disposed at a vehicle door body of a vehicle. The vehicle door beam includes: a beam body extending along a front-rear direction of the vehicle; and a bracket joining the beam body to the vehicle door body. The bracket includes a rib formed continuously on an extension line of the bracket extending along the beam body, and the rib is continued to a position of an end of the bracket.

In this way, at the initial stage of side protrusion when deformation is generated in the vehicle door beam under side impact, the bracket is bent and deformed in the up-down direction taking the rib as the starting point (the entire bracket is formed into substantially a C-shape by such bending and deformation). Then, the bracket deformed into substantially a C-shape is deformed toward the vehicle width direction and displaced toward the vehicle inner side. Accordingly, impact absorption capacity can be enhanced through deformation of the bracket, improving safety.

In an embodiment of the disclosure, the bracket includes an accommodating recess part accommodating a portion of the beam body. The rib is connected to the accommodating recess part.

In this way, when deformation is generated under an impact force, the bracket can be relatively reliably bent and deformed in the up-down direction.

In an embodiment of the disclosure, the accommodating recess part includes: an upper wall; a lower wall; and a vehicle inner wall connecting the upper wall and the lower wall and being located at a vehicle inner side of the beam body.

In this way, when deformation is generated under an impact force, the accommodating recess part can be relatively reliably bent and deformed in the up-down direction.

In an embodiment of the disclosure, the bracket includes a wall rib formed extending along at least one of the upper wall and the lower wall.

In this way, when deformation is generated under an impact force, the rigidity other than the accommodating recess part can be enhanced, so that the accommodating recess part can be relatively reliably bent and deformed in the up-down direction.

In an embodiment of the disclosure, the bracket includes a bent portion formed on at least one of an upper edge and a lower edge of the bracket along the accommodating recess part.

In this way, when deformation is generated under an impact force, rigidity of the portion other than the accommodating recess part can be enhanced, so that the accommodating recess part can be relatively reliably bent and deformed in the up-down direction.

In an embodiment of the disclosure, the end of the bracket and the accommodating recess part are connected through a planar portion other than the rib.

In this way, when deformation is generated in the vehicle door beam under impact, the bracket can be stably bent and deformed in the up-down direction taking the rib as the starting point, so that impact absorption capacity of the bracket can be relatively stably obtained.

Effects

Based on the foregoing, in the vehicle door beam of the disclosure, since the rib is formed continuously on the extension line of the bracket extending along the beam body and is continued to the position of the end of the bracket, at the initial stage of side protrusion when deformation is generated in the vehicle door beam under side impact, the bracket is bent and deformed in the up-down direction taking the rib as the starting point (the entire bracket is formed into substantially a C-shape by such bending and deformation). Then, the bracket deformed into substantially a C-shape is deformed toward the vehicle width direction and displaced toward the vehicle inner side. Accordingly, impact absorption capacity can be enhanced through deformation of the bracket, improving safety.

To make the aforementioned more comprehensible, several embodiments accompanied with drawings are described in detail as follows.

Hereinafter, the embodiments of the disclosure will be described with reference to the drawings. In the embodiments described below, the scope of the disclosure is not necessarily limited to the number, amount, or the like being referred to unless otherwise specified. In addition, in the embodiments below, each constituent element is not necessarily requisite for the disclosure unless otherwise specified. Furthermore, in the case where multiple embodiments are present below, it is originally intended that the featuring parts of the embodiments are combinable with each other as appropriate unless otherwise specified.

A vehicle door beam including the disclosed embodiments will be described with reference to the drawings. In the drawings, X represents a front direction of a front-rear direction of the vehicle, Z represents an up direction of an up-down direction of the vehicle, and Y represents an inner direction of a width direction of the vehicle. In addition, the directions and positions in the description of the disclosure are defined on the premise that the front of the vehicle faces forward. Hereinafter, embodiments of the disclosure related to a vehicle door beam disposed at a door of a vehicle are provided for detailed description with reference to the drawings.

Figure 2:
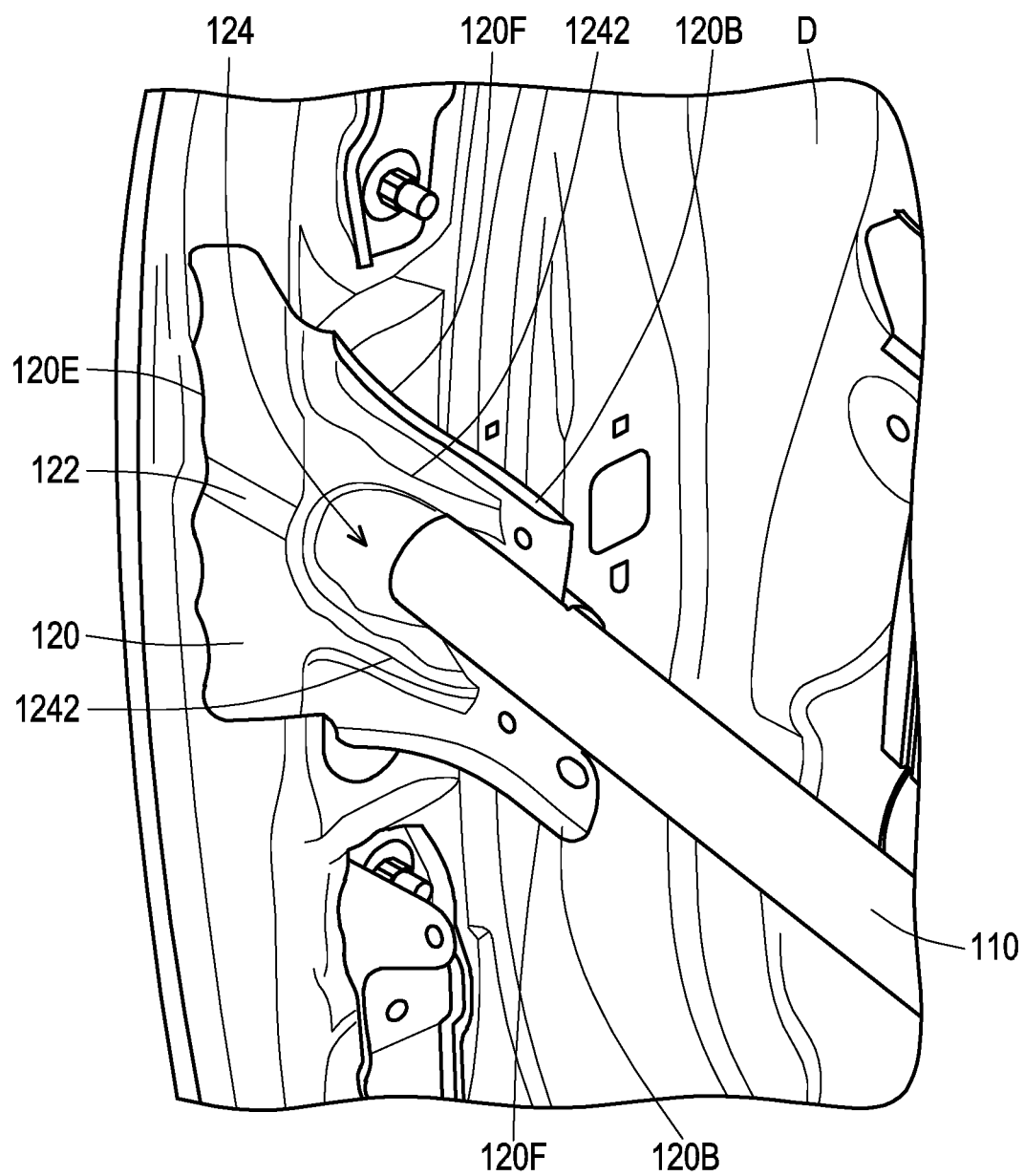
FIG. 2 is a partially enlarged view of FIG. 1.

FIG. 1 is a schematic view schematically showing a vehicle door beam disposed at a vehicle door body according to an embodiment of the disclosure. FIG. 2 is a partially enlarged view of FIG. 1. FIG. 2 is shows part of the vehicle door beam disposed at the vehicle door body, and FIG. 1 and FIG. 2 are schematic views of the vehicle door beam viewed from a vehicle outer side. With reference to FIG. 1 and FIG. 2, the vehicle door beam 1 of the disclosure may be mounted at the vehicle door body of the vehicle. In addition, in this embodiment, the vehicle door at the left side (front left side or rear left side) of the vehicle is taken as an example for description. Nonetheless, the vehicle door beam of the disclosure may also be disposed at any vehicle door of a vehicle, and the disclosure is not limited thereto.

With reference to FIG. 1 and FIG. 2, a vehicle door beam 100 disposed at a vehicle door body D includes a beam body 110 and a bracket 120. The beam body 110 extends along the front-rear direction of the vehicle. The bracket 120 joins the beam body 110 to the vehicle door body D. The bracket 120 includes a rib 122. The rib 122 is formed continuously on an extension line of the bracket 120 extending along the beam body 110 and is continued to a position of an end 120E of the bracket 120. The end 120E of the bracket 120 is, for example, located in front of the front end of the beam body 110, that is, at the position of the frontmost end of the bracket 120 in the front-rear direction (or on the extension line along the length direction of the beam body 110). In this embodiment, for example, the vehicle door body D includes a vehicle door inner panel and a vehicle door outer panel. The rib 122 disposed at the bracket 120 is a stepped bead formed on the surface of the bracket 120, for example. The bead extends continuously along the length direction of the beam body 110 till the position of the end 120E of the bracket 120. For example, there is a step difference between the portion of the bracket 120 where the rib 122 is formed and the portion of the bracket 120 where the rib 122 is not formed. The rib 122 disposed at the bracket 120 is a bead, for example. The rib 122 is formed by pressing operation or compression molding, for example, and may be formed to have an arc-shaped (substantially semicircular) cross-sectional shape. The rib 122 may be formed to have a shape protruding from the surface of the bracket 120.

Since the rib 122 is disposed to continue to the end 120E of the bracket 120, at the initial stage of side protrusion when deformation is generated in the vehicle door beam 100 under side impact, the bracket 120 is bent and deformed in the up-down direction taking the rib 122 as the starting point (the entire bracket 120 is formed into substantially a C-shape by such bending and deformation). Then, the bracket 120 deformed into substantially a C-shape is deformed toward the vehicle width direction and displaced toward the vehicle inner side. Accordingly, impact absorption capacity can be enhanced through deformation of the bracket 120, improving safety.

Figure 3:
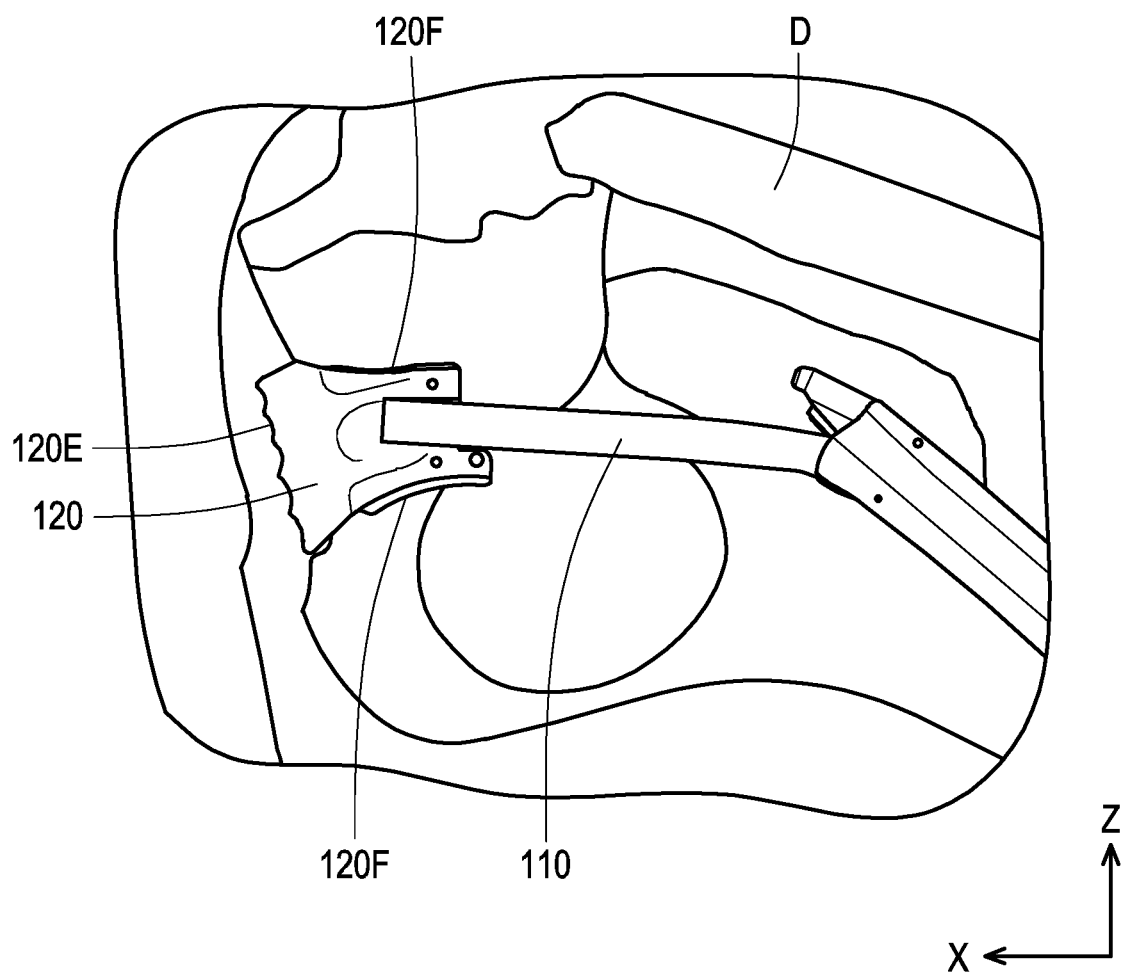
FIG. 3 is a schematic view schematically showing deformation of the vehicle door beam of FIG. 1 viewed when side protrusion occurs.
Figure 4:
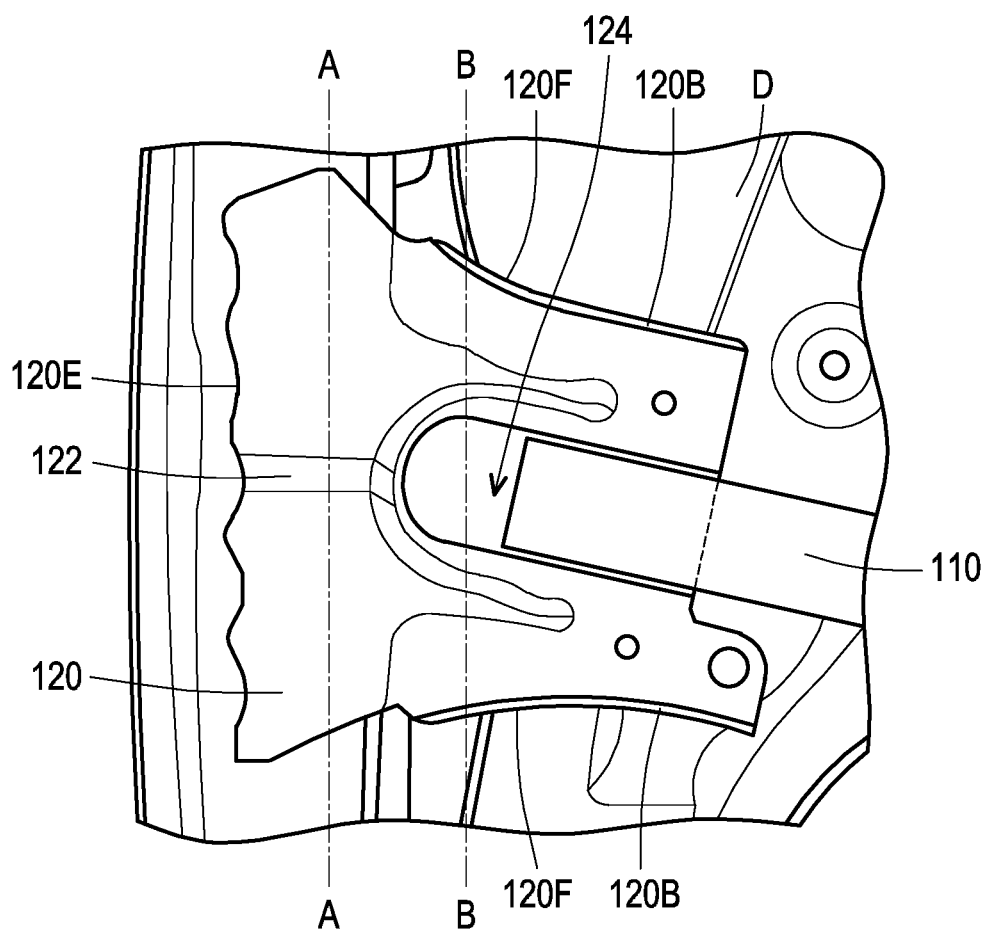
FIG. 4 is a schematic view of the bracket of the vehicle door beam in FIG. 2 viewed from a different perspective.

FIG. 3 is a schematic view schematically showing deformation of the vehicle door beam of FIG. 1 viewed when side protrusion occurs. FIG. 4 is a schematic view of the bracket of the vehicle door beam in FIG. 2 viewed from a different perspective. As shown in FIG. 1 to FIG. 4, the bracket 120 includes an accommodating recess part 124 accommodating a portion of the beam body 110. The rib 122 is connected to the accommodating recess part 124. The rib 122 extends continuously along the length direction of the beam body 110 from the side of the accommodating recess part 124 closer to the end 120E of the bracket 120 till the end 120E of the bracket 120. In this way, when deformation is generated in the vehicle door beam 100 under an impact force, since the accommodating recess part 124 is connected to the end 120E of the bracket 120 (i.e., formed continuously) through the rib 122, the bracket 120 can be relatively reliably bent and deformed in the up-down direction.

FIG. 5 is a schematic view of the bracket of the vehicle door beam viewed from line A-A in FIG. 4. FIG. 6 is a schematic view of the bracket of the vehicle door beam viewed from line B-B in FIG. 4. With reference to FIG. 4 to FIG. 6, the accommodating recess part 124 includes an upper wall 124UW, a lower wall 124LW, and a vehicle inner wall 124IW. In other words, the accommodating recess part 124 is a groove formed as surrounded by the upper wall 124UW, the lower wall 124LW, and the vehicle inner wall 124IW. The groove has substantially a C-shape into which an end of the beam body 110 may be inserted. The vehicle inner wall 124IW connects the upper wall 124UW and the lower wall 124LW, and the vehicle inner wall 124IW is located at the vehicle inner side of the beam body 110. As shown in FIG. 2 and FIG. 4, when viewed from the vehicle outer side, the vehicle inner wall 124IW of the accommodating recess part 124 is located between the beam body 110 and the vehicle door inner panel of the vehicle door body D. In this way, when deformation is generated in the vehicle door beam 100 under an impact force, since the vehicle inner wall 124IW of the accommodating recess part 124 is pressed by the beam body 110 in a direction toward the vehicle inner side, the accommodating recess part 124 can be relatively reliably bent and deformed in the up-down direction (as shown in FIG. 3).

In this embodiment, to strengthen rigidity of the portion of the bracket 120 other than the accommodating recess part 124, the bracket 120 includes a wall rib 1242 extending along at least one of the upper wall 124UW and the lower wall 124LW. The wall rib 1242 may be disposed at only the side of the upper wall 124UW of the accommodating recess part 124, and may also be disposed at only the side of the lower wall 124LW of the accommodating recess part 124. Also, the wall rib 1242 may be disposed at each of the upper wall 124UW and the lower wall 124LW. As shown in FIG. 2 and FIG. 4, in this embodiment, the wall rib 1242 being formed on each of the upper wall 124UW and the lower wall 124LW of the accommodating recess part 124 so as to extend along the upper wall 124UW and the lower wall 124LW is taken as an example. The disclosure is not limited thereto.

In this way, when deformation is generated in the vehicle door beam 100 under an impact force, since the wall rib 1242 is disposed at the upper wall 124UW and/or the lower wall 124LW of the accommodating recess part 124, rigidity of the portion other than the accommodating recess part 124 can be enhanced, so that the accommodating recess part 124 can be relatively reliably bent and deformed in the up-down direction.

In addition, to strengthen rigidity of the portion of the bracket 120 other than the accommodating recess part 124, in this embodiment, as shown in FIG. 4 and FIG. 6, the bracket 120 includes a bent portion 120B. The bent portion 120B is formed on at least one of an upper edge 120F and a lower edge 120F of the bracket 120 along the accommodating recess part 124. As shown in FIG. 4 and FIG. 6, the bracket 120 includes, on the upper side, the upper edge 120F along the front-rear direction or the length direction of the beam body 110; the bracket 120 includes, on the lower side, the lower edge 120F along the front-rear direction or the length direction of the beam body 110 (the upper edge 120F and the lower edge 120F are symmetrically formed, for example). The bent portion 120B bent along the accommodating recess part 124 toward the vehicle outer side may be formed at the upper edge 120F, and the bent portion 120B bent along the accommodating recess part 124 toward the vehicle outer side may be formed at the lower edge 120F. In this embodiment, forming the bent portion 120B at each of the upper edge 120F and the lower edge 120F is taken as an example. Nonetheless, the bent portion 120B along the accommodating recess part 124 may be formed at the upper edge 120F and/or the lower edge 120F of the bracket 120 depending on the actual requirements, and the disclosure is not limited thereto.

In this way, when deformation is generated in the vehicle door beam 100 under an impact force, since the bent portion 120B formed along the accommodating recess part 124 is disposed at the upper edge 120F and/or the lower edge 120F of the bracket 120, rigidity of the portion other than the accommodating recess part 124 can be enhanced, so that the accommodating recess part 124 can be relatively reliably bent and deformed in the up-down direction.

In addition, to make the bracket 120 stably bent and deformed in the up-down direction taking the rib 122 of the bracket 120 as the initial point, in this embodiment, as shown in FIG. 4 and FIG. 5, the end 120E of the bracket 120 and the accommodating recess part 124 are connected through a planar portion other than the rib 122. As shown in FIG. 5, in the bracket 120, the region other than the portion where the rib 122 is formed may be formed into a planar shape. For example, in the upper half of the bracket 120, the region from the rib 122 to the upper edge 120F is formed into a planar shape, and in the lower half of the bracket 120, the region from the rib 122 to the lower edge 120F is formed into a planar shape. In addition, depending on the actual manufacturing circumstances, the planar shape may include some corrugation, which may be regarded an insignificant corrugated shape compared with the corrugated shape formed in the depth direction by the rib 122 formed on the surface of the bracket 120.

In this way, when deformation is generated in the vehicle door beam 100 under impact, the bracket 120 can be stably bent and deformed in the up-down direction taking the rib 122 as the starting point, so that impact absorption capacity of the bracket 120 can be relatively stably obtained.

In summary of the foregoing, in the vehicle door beam of the disclosure, since the rib is formed continuously on the extension line of the bracket extending along the beam body and is continued to the position of the end of the bracket, at the initial stage of side protrusion when deformation is generated in the vehicle door beam under side impact, the bracket is bent and deformed in the up-down direction taking the rib as the starting point (the entire bracket is formed into substantially a C-shape by such bending and deformation). Then, the bracket deformed into substantially a C-shape is deformed toward the vehicle width direction and displaced toward the vehicle inner side. Accordingly, impact absorption capacity can be enhanced through deformation of the bracket, improving safety.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vehicle door beam disposed at a vehicle door body of a vehicle, the vehicle door beam comprising:
    a beam body extending along a front-rear direction of the vehicle; and
    a bracket joining the beam body to the vehicle door body, wherein the bracket comprises an accommodating recess part accommodating a portion of the beam body, the accommodating recess part comprises an upper wall, a lower wall and a vehicle inner wall connecting the upper wall and the lower wall and being located at a vehicle inner side of the beam body, and the bracket comprising:
        a rib formed continuously on an extension line of the bracket extending along the beam body, the rib continued to a position of a front end of the bracket from the vehicle inner wall.

2. The vehicle door beam according to claim 1, wherein the bracket comprises:
    a wall rib formed extending along at least one of the upper wall and the lower wall.

3. The vehicle door beam according to claim 1, wherein the bracket comprises:
    a bent portion formed on at least one of an upper edge and a lower edge of the bracket along the accommodating recess part.

4. The vehicle door beam according to claim 1, wherein the front end of the bracket and the accommodating recess part are connected through a planar portion other than the rib.

5. The vehicle door beam according to claim 2, wherein the bracket comprises:
    a bent portion formed on at least one of an upper edge and a lower edge of the bracket along the accommodating recess part.

6. The vehicle door beam according to claim 2, wherein the front end of the bracket and the accommodating recess part are connected through a planar portion other than the rib.

* * * * *